(12) United States Patent
Bomsztyk et al.

(10) Patent No.: US 12,472,643 B2
(45) Date of Patent: Nov. 18, 2025

(54) PLATE HANDLING DEVICES AND METHODS FOR PLATE HANDLING OF ANALYTICAL AND CULTURE VESSELS

(71) Applicants: Matchstick Technologies, Inc., Kirkland, WA (US); University of Washington, Seattle, WA (US)

(72) Inventors: Karol Bomsztyk, Mercer Island, WA (US); Gregory P. Darlington, Snohomish, WA (US); Daniel S. Mar, Seattle, WA (US); Gregory T. Wing, Bellevue, WA (US)

(73) Assignees: Matchstick Technologies, Inc.; University of Washington

( * ) Notice: Subject to any disclaimer, the term of this patent is extended or adjusted under 35 U.S.C. 154(b) by 912 days.

(21) Appl. No.: 17/680,417

(22) Filed: Feb. 25, 2022

(65) Prior Publication Data

US 2022/0274265 A1    Sep. 1, 2022

Related U.S. Application Data

(60) Provisional application No. 63/154,534, filed on Feb. 26, 2021.

(51) Int. Cl.
*B25J 15/00* (2006.01)
*B25J 11/00* (2006.01)

(52) U.S. Cl.
CPC ......... *B25J 15/0014* (2013.01); *B25J 11/008* (2013.01)

(58) Field of Classification Search
CPC ... B25J 15/0014; B25J 1/02; B25J 1/04; B25J 15/008

USPC ................................................. 294/104, 213
See application file for complete search history.

(56) References Cited

U.S. PATENT DOCUMENTS

| | | | | |
|---|---|---|---|---|
| 370,565 A | * | 9/1887 | Soule | |
| 1,041,949 A | * | 10/1912 | Bandemer | E04G 21/16 |
| | | | | 269/208 |
| 4,223,934 A | * | 9/1980 | Cauceglia | H05K 7/1415 |
| | | | | 294/34 |
| 5,039,150 A | * | 8/1991 | Jones | B65G 7/12 |
| | | | | 294/62 |
| 5,820,180 A | * | 10/1998 | Haupt | B65G 7/12 |
| | | | | 294/16 |
| 7,240,934 B2 | * | 7/2007 | Lausell | B65G 7/12 |
| | | | | 294/16 |
| 7,997,633 B2 | * | 8/2011 | Bahler | B65G 7/12 |
| | | | | 269/228 |
| 9,119,996 B2 | * | 9/2015 | Vail | B25J 1/04 |

(Continued)

*Primary Examiner* — Paul T Chin
(74) *Attorney, Agent, or Firm* — Clements Bernard Walker; Christopher L. Bernard; Devin Cummins

(57) ABSTRACT

A plate handling device includes a base having a first and second base member configured to hold a plate. The base is adapted to expand and contract to secure the plate to the plate handling device. The plate handling device includes a handle having an upper end and a lower end, and the handle is adapted to actuate the expanding and contracting of the base to secure and hold the plate. An outer handle member is fixedly attached to the first base member. A user interface member is fixedly attached to the second base member, is pivotably attached to the lower end of the handle, and is pivotably receivable in portions of the outer handle member.

22 Claims, 11 Drawing Sheets

(56) References Cited

U.S. PATENT DOCUMENTS

2013/0249226 A1* 9/2013 Marshall ................ A47J 45/10
  294/34
2013/0307283 A1* 11/2013 Rees .................... G11B 33/128
  294/104

* cited by examiner

PLATE HANDLING DEVICES AND METHODS FOR PLATE HANDLING OF ANALYTICAL AND CULTURE VESSELS

CROSS-REFERENCE TO RELATED APPLICATION

The present disclosure claims the benefit of priority of U.S. Provisional Patent Application No. 63/154,534, filed on Feb. 26, 2021, and entitled "DEVICES AND METHODS FOR HAND-INDIRECT HANDLING OF ANALYTICAL AND CULTURE VESSELS," the contents of which are incorporated in full by reference herein.

STATEMENT REGARDING FEDERALLY SPONSORED RESEARCH

This invention was made with government support under Grant nos. R42 HG010855, U01 CA246503, and R44 GM122097 awarded by the National Institutes of Health. The government has certain rights in the invention.

FIELD OF THE DISCLOSURE

The present disclosure is related to the handling of vessels used in research and laboratory environments. More specifically, the present disclosure provides devices and methods for hand-indirect handling of analytical and culture vessels.

BACKGROUND OF THE DISCLOSURE

The statements in this section merely provide background information related to the present disclosure and may not constitute prior art.

Many vessels, such as plates and flasks, of different sizes and different geometries and shapes are used in research and diagnostic fields. Such plates may include, for example, microplates, microwell plates, multiwells, and the like (all referred to herein as a "plate"). The plates and flasks are most often handled with gloved hands.

In many situations, picking up and holding plates or flasks with a user's fingers can be awkward and messy. For example, such situations may include removing plates from polymerase chain reaction (PCR) cyclers, removing plates from hot water baths, removing plates from sonicators, removing plates and/or flasks from culture incubators, holding plates or flasks that are wet with detergents or water, and placing/removing plates from automated systems. Additionally, plates can be "stuck" in an instrument. Further, direct handling of tissue culture plates could potentially contaminate gloves (such as with pathogens), thereby possibly posing biohazards during removal of the gloves.

There are no currently known hand-held tools to permit hand-indirect handling of such vessels.

BRIEF SUMMARY OF THE DISCLOSURE

Disclosed embodiments include illustrative devices for hand-indirect handling of analytical and culture vessels and illustrative methods for hand-indirect handling of analytical and culture vessels.

In an embodiment, a plate handling device for handling of analytical and culture vessels includes: a base having a first and second base member configured to hold a plate, wherein the base is adapted to expand and contract to secure the plate to the plate handling device; and a handle having an upper end and a lower end, wherein the handle is adapted to actuate the expanding and contracting of the base to secure and hold the plate. The handle further includes: an outer handle member fixedly attached to the first base member; and a user interface member fixedly attached to the second base member, wherein the user interface member is pivotably attached to the lower end of the handle and pivotably receivable in portions of the outer handle member. The plate handling device includes a plurality of biasing members adapted to produce a constant force on the plate when the plate is held by the base, where the constant force is sufficient to hold the base, as well as provide sufficient gripping force to remove the plate from various instruments. The base may further include a plurality of plate interfacing members fixedly attached to the first and second base members and adapted to align and grasp the plate. The plate interfacing members are tapered for easy alignment and self-centering of the plate handling device with respect to the plate. The plate interfacing members further include a plurality of grip inserts adapted to grip the plate. The surfaces near the plate are shaped to minimize the chances of damage. The user interface member is pivotably attached to the lower end of the handle with a pin. The base is adapted to be stable on a flat surface without a plate installed. The upper end of the handle is adapted to rest on top of a user's hand.

In another embodiment, a method of handling a plate with a plate handling device includes the steps of: grabbing a handle of a plate handling device; squeezing the handle to compress a user interface member, wherein the squeezing opens a base of the plate handling device; positioning the base of the plate handling device over a plate; releasing the handle of the plate handling device, wherein the releasing causes the base to contract around the plate and secure the plate; and handling the plate with the plate handling device. The plate handling device includes: a base having a first and second base member configured to hold a plate, wherein the base is adapted to expand and contract to secure the plate to the plate handling device; and a handle having an upper end and a lower end, wherein the handle is adapted to actuate the expanding and contracting of the base to secure and hold the plate. The handle further includes: an outer handle member fixedly attached to the first base member; and a user interface member fixedly attached to the second base member, wherein the user interface member is pivotably attached to the lower end of the handle and pivotably receivable in portions of the outer handle member. The plate handling device includes a plurality of biasing members adapted to produce a constant force on the plate when the plate is held by the base. The base may further include a plurality of plate interfacing members fixedly attached to the first and second base members and adapted to align and grasp the plate. The plate interfacing members are tapered for easy alignment and self-centering of the plate handling device with respect to the plate. The plate interfacing members further include a plurality of grip inserts adapted to grip the plate. The surfaces near the plate are shaped to minimize the chances of damage. The user interface member is pivotably attached to the lower end of the handle with a pin. The base is adapted to be stable on a flat surface without a plate installed. The upper end of the handle is adapted to rest on top of a user's hand.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION OF THE DISCLOSURE

The following description is merely illustrative in nature and is not intended to limit the present disclosure, application, or uses.

As will be discussed in further detail below, disclosed embodiments include illustrative devices for hand-indirect handling of analytical and culture vessels and illustrative methods for hand-indirect handling of analytical and culture vessels.

Although the embodiments illustrated herein describe hand-indirect handling of a plate, it can be shown by one skilled in the art that the end-effector of this hand-operated device can be adapted as the end-effector of a robotic manipulator in an automated handling system as well.

Although the embodiments illustrated herein describe hand-indirect handling of one plate, it can be shown that an iteration of the hand-indirect plate handler can be adapted to carry, load, and remove multiple plates in racks as well, such as used in automated high throughput liquid handlers.

In various embodiments, an illustrative plate handling device permits hand-indirect handling of analytical and culture vessels. It will be appreciated that various embodiments of the plate handling device can help a user pick up and carry a variety of vessels, such as plates (including, without limitation, microplates, microwell plates, multiwells, and the like) and flasks, while helping keep the user's hand clear of fluids (such as, without limitation, water, detergent, baths of hot water, and the like) or contaminants (such as, without limitation, biohazards, pathogens, and the like). It will also be appreciated that, in various embodiments, the plate handling device can help a user align the handling device to a vessel, pick up the vessel, and carry the vessel without inadvertently releasing the vessel. It will also be appreciated that, in various embodiments, the plate handling device can help a user intuitively keep the vessel (that is held by the plate handling device) in a vertical (that is, not tilted) orientation. Additionally, in various embodiments the plate handling device can help provide a user with gripping and leverage for easy removal of a stuck plate from an instrument.

Figure 1:
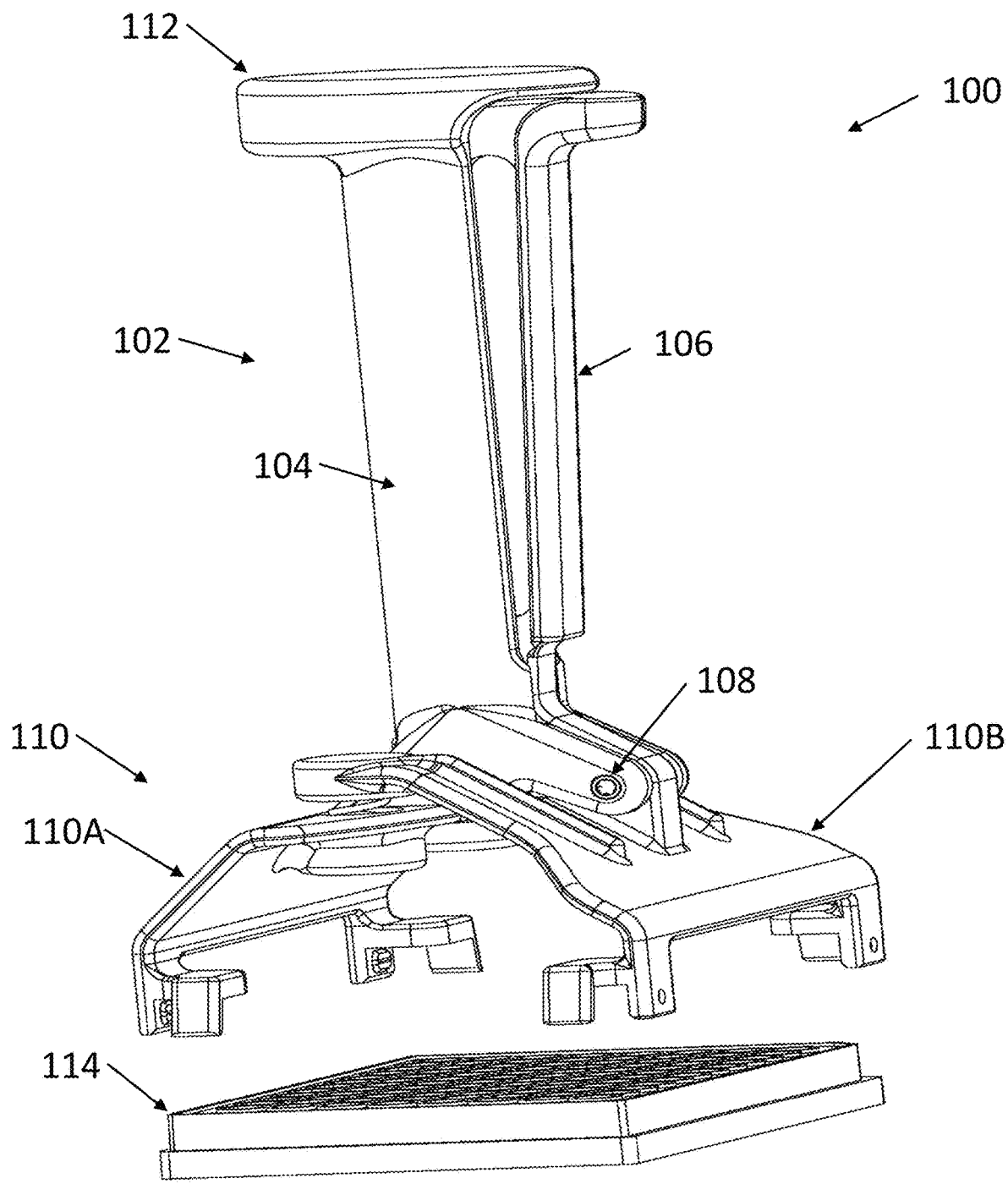
FIG. 1 is a perspective view of an illustrative device for hand-indirect handling of analytical and culture vessels and a microplate.

Referring to FIG. 1, in various embodiments the plate handling device 100 includes a handle 102 having an upper end and a lower end. The handle includes an outer handle member 104 a user interface member 106 pivotably attached to the lower end of the handle via a pin 108 disposed in a hole defined in the outer handle member 104 toward the lower end of the handle 100. The user interface member 106 is pivotably receivable in portions of the outer handle member 104, allowing the user interface member 106 to slide and/or rotate inside of the outer handle member 104. A base 110 includes two base members. A first base member 110A extends from the outer handle member 104 and a second base member 110б extends from the user interface member 106. The first base member 110A and second base member 110б, being fixed to the outer handle member 104 and user interface member 106, rotate independent of each other via the pin 108 causing the base 110 to expand and contract when the user interface member 106 is actuated.

The upper end of the handle 102 further includes an enlarged portion 112. The outer handle member 104 and the user interface member 106 both include an enlarged section at the upper end of the handle 102 to make up the enlarged portion 112 of the handle 102. This enlarged portion 112 is adapted to rest on top of a user's hand when a user grips the handle 102 as to provide additional support when the plate handling device 100 is in use.

A plate 114 is shown in FIG. 1 and represents a variety of vessels, such as plates (including, without limitation, microplates, microwell plates, multiwells, and the like) and flasks. The plate 114 is gripped using the plate handling device 100 of the present disclosure by way of the base 110. The first base member 110A and the second base member 110б, again, are fixed to the outer handle member 104 and user interface member 106. This causes the base 110 to expand and contract when the user interface member 106 is actuated, thus allowing the base 110 to grip a plate 114. In various embodiments the base 110 expands when the user interface member 106 is compressed by a user via the handle 102, thus becoming compressed (and gripping a plate 114) when the user interface member 106 is released. In other embodiments, other actuation methods are contemplated, such as the base 110 becoming compressed (gripping) when the user interface member is actuated (compressed into the outer handle member 104). It will be appreciated that the plate handling device 100 of FIG. 1 shall be construed as a non-limiting example.

Figure 2:
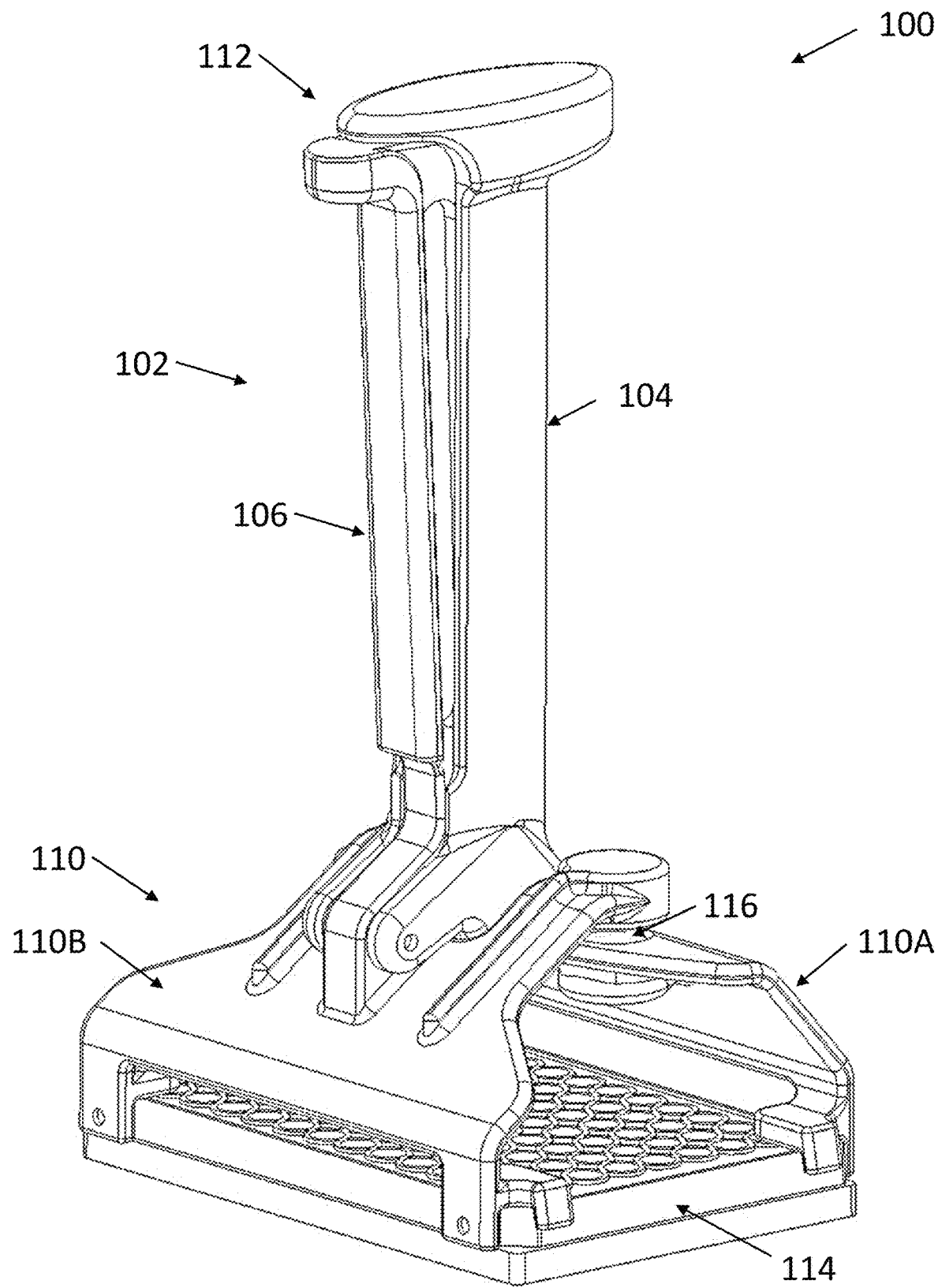
FIG. 2 is a perspective view of the plate handling device of the present disclosure gripping the microplate of FIG. 1.

Referring to FIG. 2, biasing members 116 (such as, without limitation, compression springs or the like) urge the base members (first base member 110A and second base member 110б) pivotably and inwardly toward each other to grip the plate 114. In various embodiments the biasing members 116 (that are in compression) urge the base members pivotably and inwardly toward each other and exert a predetermined, constant force that enables portions of the base members to grip the plate 114. This approach helps reduce the chances for too low of a grip force (which may result in a dropped plate 114) and too high of a grip force (which may result in a damaged plate 114). Thus, when the plate handling device is engaged with a plate 114, the plate 114 is securely held in place until the user releases the plate 114. The user can release the plate by squeezing the user interface member 106, thereby overcoming the compression force exerted by the biasing members 116 and urging the base members outwardly (expanding) away from each other such that the portions of the base members no longer grip the plate 114. In various embodiments the plate handling device 100 includes motion range stops 118 to help reduce user fatigue (discussed in more detail in FIG. 5).

Again, in various embodiments, the upper end of the handle 102 has an enlarged portion 112 that extends radially past the outline of the top end of the handle 102 (including the outer handle member 104 and the user interface member 106). This enlarged portion 112 is sized and shaped to rest on top of the user's hand (such as on top of a user's thumb and index finger), so no squeezing force is entailed to carry the plate handling device 100. This characteristic, along with the center of gravity being close to the longitudinal axis of the handle 102, helps the user keep the plate 114 horizontal (that is, upright) while carrying the plate 114 that is gripped and held by the plate handling device 100. Also, in various embodiments the plate handling device 100 is designed to be stable while sitting on a bench or other horizontal surface with or without a plate 114 gripped thereby. In such embodiments, it will be appreciated that the center of gravity and the handle 102 of the plate handling device 100 is close to center over the plate 114.

In various embodiments the body of the plate handling device 100 (that is, components such as the handle 102 and the base members) may be made from anodized aluminum to help provide for durability and easy cleaning. However, it will be appreciated that other materials, such as without limitation plastics, may be used as desired for a particular application.

Figure 3:
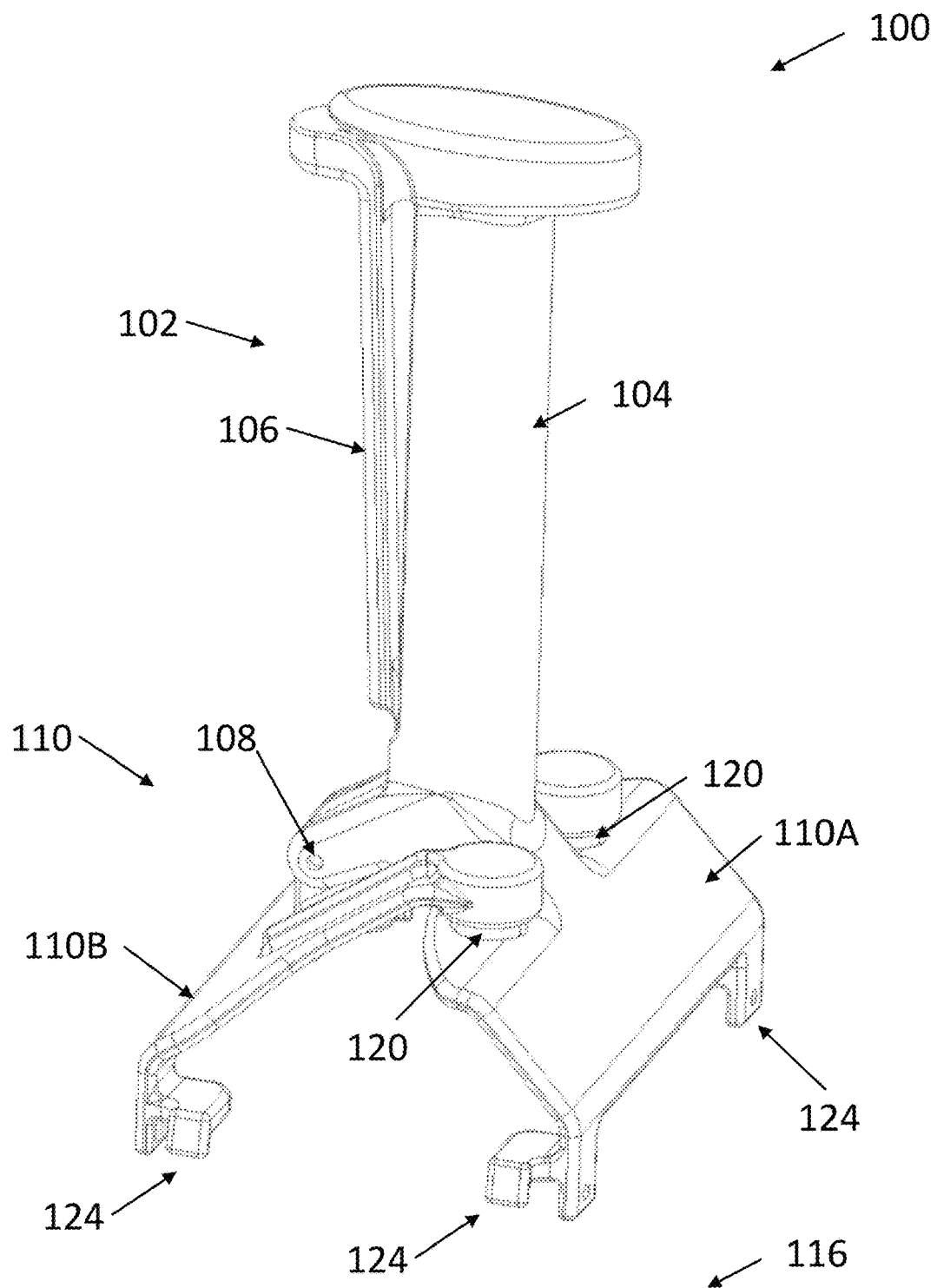
FIG. 3 is a perspective view of the plate handling device of the present disclosure.

Referring now to FIG. 3, a perspective view of the plate handling device of the present disclosure is shown. The plate handling device 100 again includes a handle 102 having an upper end and a lower end. The handle 102 again includes an outer handle member 104 a user interface member 106 pivotably attached to the lower end of the handle via a pin 108 disposed in a hole defined in the outer handle member 104 toward the lower end of the handle 100. The user interface member 106 is pivotably receivable in portions of the outer handle member 104, allowing the user interface member 106 to slide and/or rotate inside of the outer handle member 104. A base 110 again includes the two base members. The first base member 110A extends from the outer handle member 104 and the second base member 110B extends from the user interface member 106. The first base member 110A and second base member 110B, being fixed to the outer handle member 104 and user interface member 106, rotate independent of each other via the pin 108 causing the base 110 to expand and contract when the user interface member 106 is actuated.

In various embodiments, the plate handling device 100 further includes cavities 120 positioned on the base members (first base member 110A and second base member 110B). The cavities 120 are adapted to house and retain the biasing members 116, allowing the biasing members 116 to urge the base members pivotably and inwardly toward each other to grip the plate 114. In the present embodiment, the biasing members 116 are springs disposed inside of the cavities 120. The springs are compressed inside of the cavities 120, resulting in a force causing the base 110 to contract and grip the plate 114 (shown in FIG. 2). It will be appreciated that the biasing members 116 of the present embodiment may include any other force providing device such as the springs of the present disclosure.

In another embodiment, the mechanism is altered such that the force vectors are reversed, thereby gripping the plate when the operator squeezes the handle and releasing the plate when the operator releases the handle.

In various embodiments, the cavities 120 in the second base member 110B are disposed in elongated members 122. The elongated members 122 extend past the pin 108 which is the point of rotation. Thus, the force from the biasing members 116 causes the second base member 110B to rotate, urging the base members pivotably and inwardly toward each other to grip the plate 114.

In various embodiments, the base members (first base member 110A and second base member 110B) include a plurality of plate interfacing members 124, adapted to guide the plate handling device 100 onto a plate 114 and grip the plate 114 in the base 110 of the plate handling device 100. In the present embodiment shown in FIG. 3, the plate interfacing members 124 are positioned along the outer corners of the base 110 to secure and grip the corners of the plate 114. Additionally, some embodiments further include grip inserts 126 disposed along the inner surfaces of the plate interfacing members 124. The inner surfaces being the surfaces which contact the plate 114 when a plate 114 is secured to the plate handling device 100.

Figure 4:
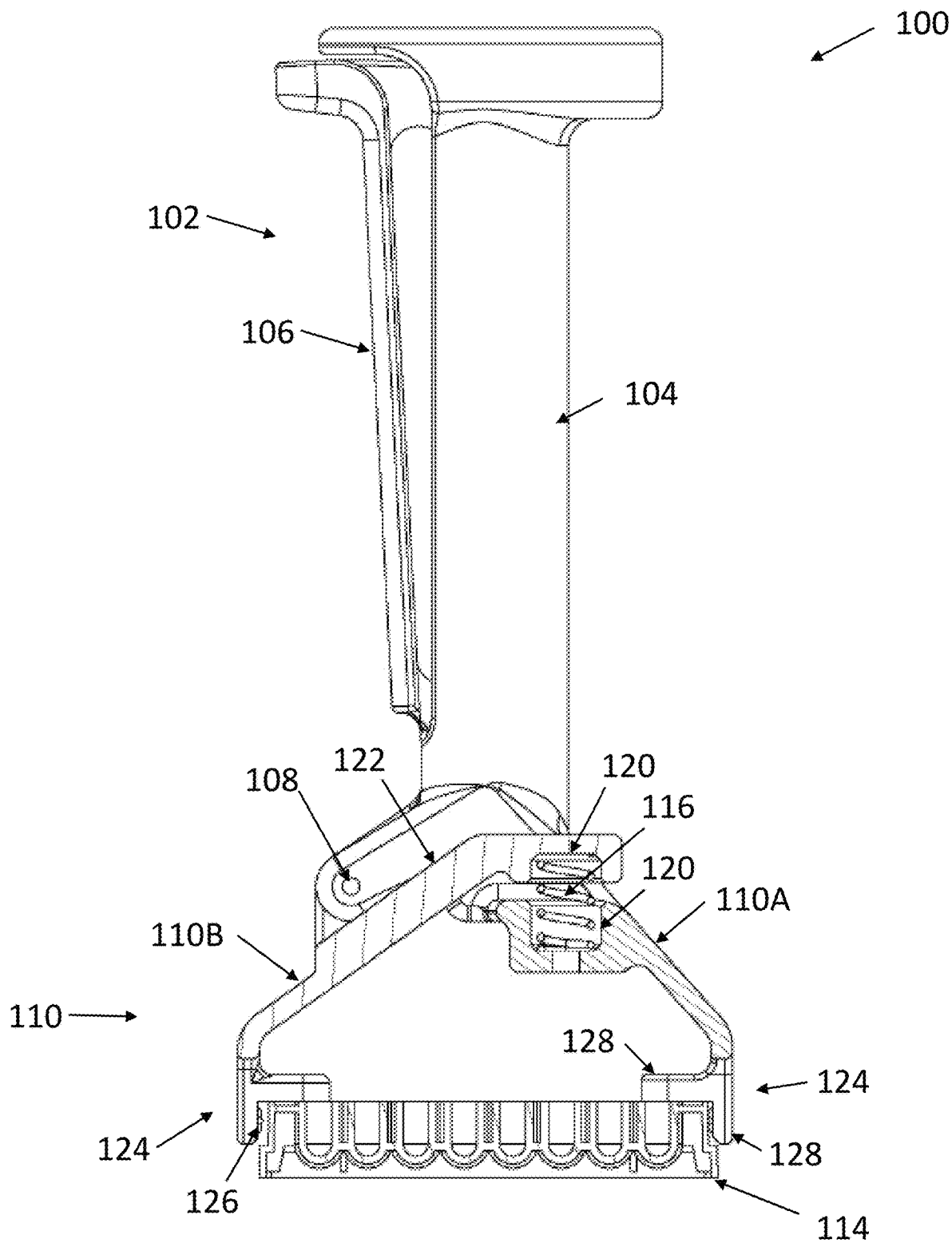
FIG. 4 is a side cross section view of the plate handling device of the present disclosure.

Referring now to FIG. 4, a side section view of the plate handling device 100 of the present disclosure is shown. The plate handling device 100 again includes a handle 102 having an upper end and a lower end. The handle 102 again includes an outer handle member 104 a user interface member 106 pivotably attached to the lower end of the handle via a pin 108 disposed in a hole defined in the outer handle member 104 toward the lower end of the handle 100. A base 110 again includes the two base members. The first base member 110A extends from the outer handle member 104 and the second base member 110B extends from the user interface member 106.

Again, in various embodiments, cavities 120 are disposed in the first base member 110A and second base member 110B and are adapted to house and retain the biasing members 116, in this embodiment, the biasing members being springs. More clearly seen in the present figure, the elongated members 122 of the second base member 110B extend past the pin 108 and include the cavities 120 associated with the second base member 110B.

The base 110 again includes a plurality of plate interfacing members 124, adapted to guide the plate handling device 100 onto a plate 114 and grip the plate 114 in the base 110 of the plate handling device 100. The plate interfacing members 124 include a plurality of extensions 128 which make contact with the plate 114 to secure and grip the plate 114. Again, various embodiments further include grip inserts 126 disposed along the inner surfaces of the extensions 128 of the plate interfacing members 124. The inner surfaces being the surfaces which contact the plate 114 when a plate 114 is secured to the plate handling device 100.

Additionally, in various embodiments, surfaces near the plate 114 are shaped to reduce chances of contributing to damaging any film that might cover the plate 114. For example, in various embodiments bottom outside corners are cut with radii to soften the interface in instances where the plate handling device 100 approaches the plate 114 at an angle. Also, in various embodiments, plate interfacing features of the plate handling device 100 are tapered at their ends for easy alignment and self-centering of the plate handling device 100 with respect to the plate 114.

As shown in various figures, in various embodiments, four grip inserts 126 (one in each plate interfacing member 124) are used to securely hold the plate, regardless of what contaminants may be on the plate 114. In various embodiments, the grip inserts 126 may be replaceable. In various embodiments, the grip inserts 126 are shaped to help provide a secure grip on the plate 114 with use of minimalized force. The grip inserts 126 may use any type of contact, shape, and material as desired for a particular application, such as without limitation a line contact, a metal point, a metal cup point, smooth and textured rubber, and/or the like. In some embodiments the grip material is stainless steel, which can help contribute to maintaining a sharp edge and help provide for ease of cleaning. However, it will be appreciated that any material could be used as desired for a particular application, taking into consideration factors such as cost, part longevity, and the like.

In various embodiments, to use the plate handling device 100 of the present disclosure, a user will grab the handle 102 of the plate handling device 100. The user will squeeze the handle 102, compressing the user interface member 106 into the outer handle member 104, thus expanding the base 110. As the user interface member 106 is squeezed into the outer handle member 104, this causes the biasing members 116 to become increasingly compressed, and causes the second base member 110б to rotate about the pin 108. The rotation causes the base 110 to expand, creating room for a plate 114 to be positioned between of the plate interfacing members 124. To secure the plate 114 to the plate handling device 100, the user then releases the handle 102 allowing the user interface member 106 to expand. This allows the biasing members 116 to force the second base member 110б to rotate about the pin 108, causing the base 110 to contract around the plate 114, thus securing it to the plate handling device 100.

It will be appreciated that other embodiments may include different methods of using the plate handling device 100 of the present disclosure. For example, such embodiments may include pin 108 and biasing member 116 positioning which allows the base 110 to be contracted when a user squeezes the handle 102, and base 110 expansion when the handle 102 is released. The method of using the plate handling device of the present disclosure shall be construed as a non-limiting example.

Figure 5:
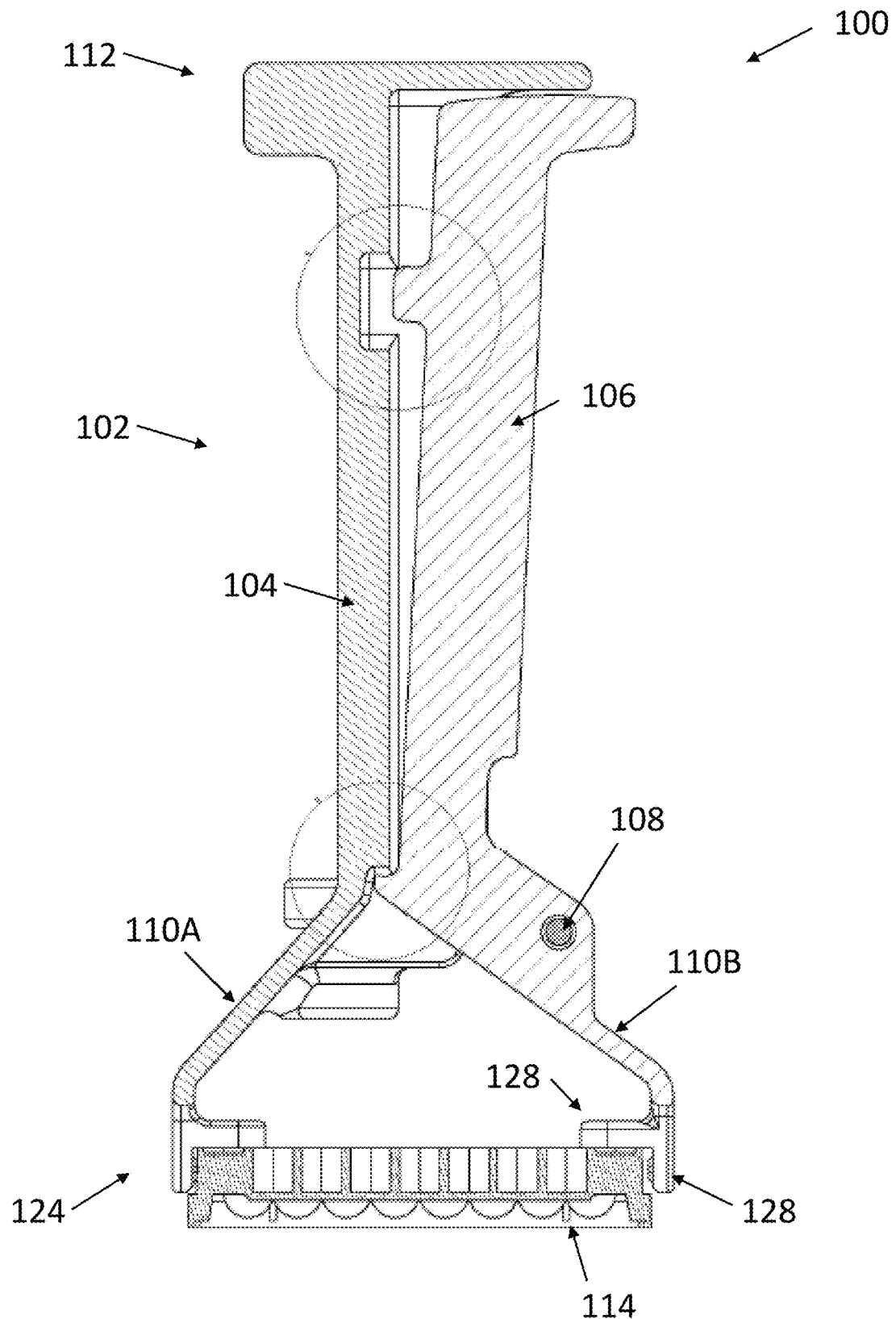
FIG. 5 is a side cross section view of the plate handling device of the present disclosure.

Referring now to FIG. 5, a side cross section view of the plate handling device 100 is shown. More particularly, a cross section of the handle 102 of the plate handling device 100 is shown. The plate handling device 100 again includes a handle 102 having an upper end and a lower end. The handle 102 again includes an outer handle member 104 a user interface member 106 pivotably attached to the lower end of the handle via a pin 108 disposed in a hole defined in the outer handle member 104 toward the lower end of the handle 100. A base 110 again includes the two base members. The first base member 110A extends from the outer handle member 104 and the second base member 110б extends from the user interface member 106.

The structure of the handle 102 and base 110 can be seen more clearly in FIG. 5, with the base members (first base member 110A and second base member 110B) extending from the handle members (104 and 106). Also more clearly seen here is the enlarged portion 112 of the handle 102. This enlarged portion being adapted to rest on top of the user's hand (such as on top of a user's thumb and index finger), so no squeezing force is entailed to carry the plate handling device 100. The enlarged portion 112 extends radially past the outline of the top end of the handle 102 (including the outer handle member 104 and the user interface member 106). This enlarged portion 112 may be sized and shaped for different purposes in various embodiments.

The base members (including the first base member 110A and second base member 110B) are adapted to allow clearance for tall containers which may be disposed on the plate 114. Both the first base member 110A and the second base member 110B are angled downward to create a space between them, creating room for objects which may be protruding from the plate 114 (such as a test tube rack and the like).

Again, in various embodiments, the body of the plate handling device (that is, components such as the handle and the base members) may be made from anodized aluminum to help provide for durability and easy cleaning. However, it will be appreciated that other materials, such as without limitation plastics, may be used as desired for a particular application.

Figure 6:
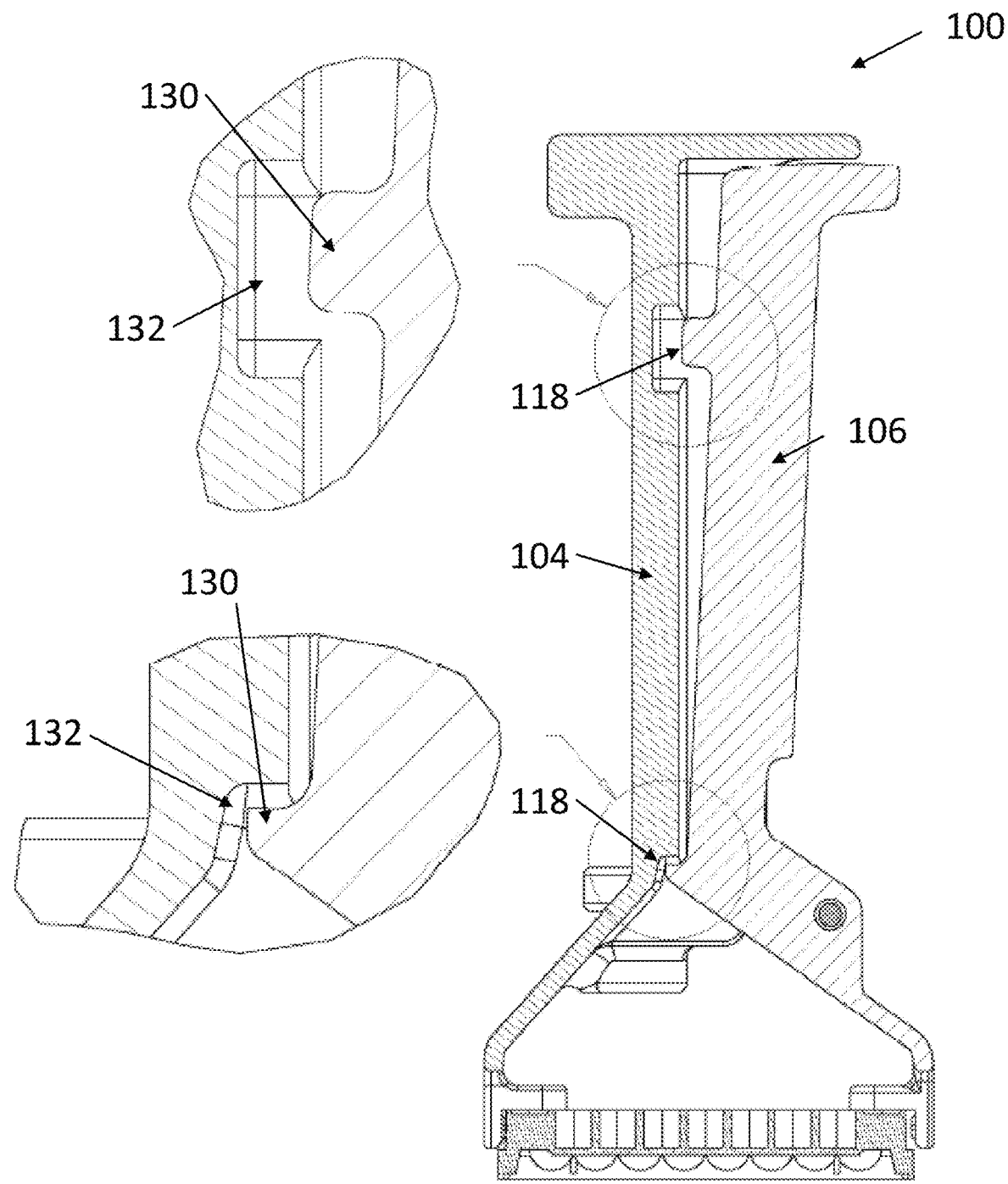
FIG. 6 is a side cross section view and section view of the plate handling device of the present disclosure.

Referring now to FIG. 6, a cross section view of the plate handling device 100 is shown. More particularly, a cross section view of the handle 102 of the plate handling device 100 is shown, presenting the motion range stops 118. The handle 102 of the plate handling device 100 of the present disclosure includes a plurality of motion range stops 118 to limit the range of motion of the device. That is, the motion range stops 118 limit the amount of movement that the user interface member 106 can encounter, thus limiting the range of movement of the base 110.

In various embodiments, the motion range stops 118 are manufactured into the handle members (outer handle member 104 and the user interface member 106). In the present embodiment, the handle 102 includes a motion range stop 118 on the upper and lower end of the handle 102. The motion range stops 118 of the present disclosure include a protrusion 130 extending from the user interface member 106 which inserts into a cavity 132 disposed into the outer handle member 104. As the user interface member 106 extends away from the outer handle member 104, the protrusion 130 is obstructed by the structure of the cavity 132 and the motion of the user interface member 106 is interrupted, thus blocking further motion. This, in turn, also limits the contracting motion of the base 110.

It will be appreciated that the motion range stops 118 of the present disclosure may include other structures and/or configurations. For example, the protrusions may be disposed on the outer handle member 104, and the cavity may be disposed into the user interface member 106. It will also be appreciated that other motion stopping mechanisms are contemplated herein.

Figure 7:
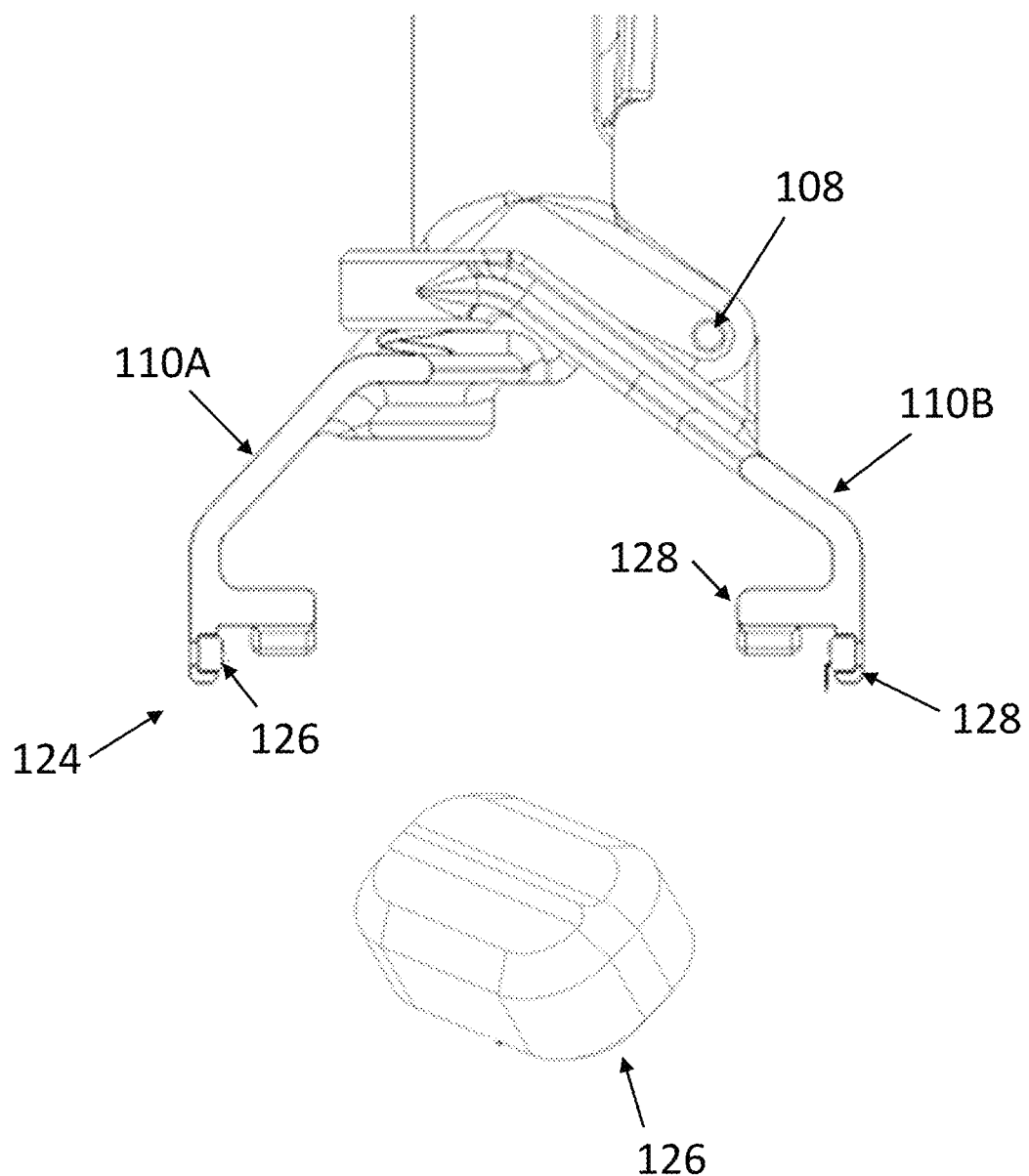
FIG. 7 is a side view of the plate handling device of the present disclosure and grip insert details.

Referring now specifically to FIG. 7, a side view of the base 110 of the plate handling device 100 of the present disclosure is shown including grip insert 126 details. The base 110 again includes a first base member 110A and a second base member 110б. The first base member 110A extends from the outer handle member 104 and the second base member 110б extends from the user interface member 106. It will be appreciated that the plate handling device 100 may include a different number of base members, both movable and fixed.

Again, In various embodiments, four grip inserts 126 (one in each plate interfacing member 124) are used to securely hold the plate, regardless of what contaminants may be on the plate 114. In various embodiments, the grip inserts 126 may be replaceable. As well as the grip inserts 126 being shaped to help provide a secure grip on the plate 114 with use of minimalized force. The grip inserts 126 may use any type of contact, shape, and material as desired for a particular application, such as without limitation a line contact, a metal point, a metal cup point, smooth and textured rubber, and/or the like. In some embodiments the grip material is stainless steel, which can help contribute to maintaining a sharp edge and help provide for ease of cleaning. However, it will be appreciated that any material could be used as desired for a particular application, taking into consideration factors such as cost, part longevity, and the like. The grip inserts 126 are disposed along the inner surfaces of the extensions 128 of the plate interfacing members 124. The inner surfaces being the surfaces which contact the plate 114 when a plate 114 is secured to the plate handling device 100. It will also be appreciated that any number of grip inserts 126 may be used depending on the particular application.

Figure 8:
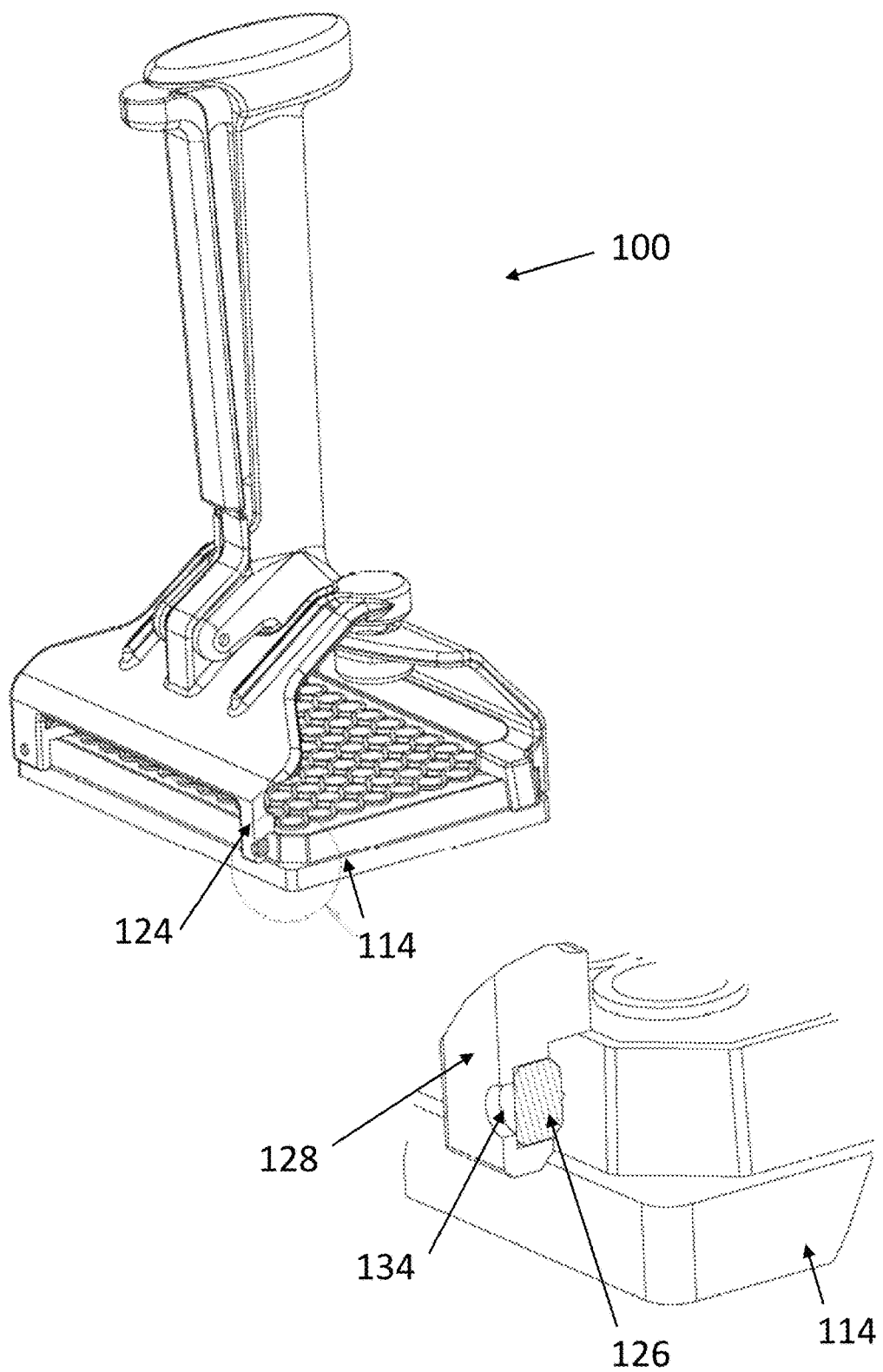
FIG. 8 is a prospective view and section view of the grip insert and plate handling device of the present disclosure.

Referring now specifically to FIG. 8, a prospective view and section view of the plate interfacing members 124, grip inserts 126, and plate handling device 100 of the present disclosure is shown. The base 110 of the plate handling device 100 again includes a plurality of plate interfacing members 124. The plate interfacing members 124 include a plurality of extensions 128 and grip inserts 126. The extensions 128 are adapted to guide the plate handling device 100 onto a plate 114 and grip the plate 114 in the base 110 of the plate handling device 100. The extensions 128 can be sized and shaped for a particular plate 114 according to the particular application to make contact with the plate 114 and to secure and grip the plate 114. Again, various embodiments further include grip inserts 126 disposed along the inner surfaces of the extensions 128 of the plate interfacing members 124. The inner surfaces being the surfaces which contact the plate 114 when a plate 114 is secured to the plate handling device 100.

The extensions 128 of the plate interfacing members 124 include a hole 134 disposed through the extension 128 on which the grip insert 126 is fixed to. The hole 134 allows a user to remove the grip insert 126 (for inspection or replacement) by pushing the grip insert 126 out of place through the hole 134. Additionally, in various embodiments, the grip inserts 126 are secured to the plate interfacing members 124 by being inserted into cavities disposed in the extensions 128. It will be appreciated that the grip inserts 126 may be fixed to the plate interfacing members 124 by any other method known to one of ordinary skill in the art.

Figure 9:
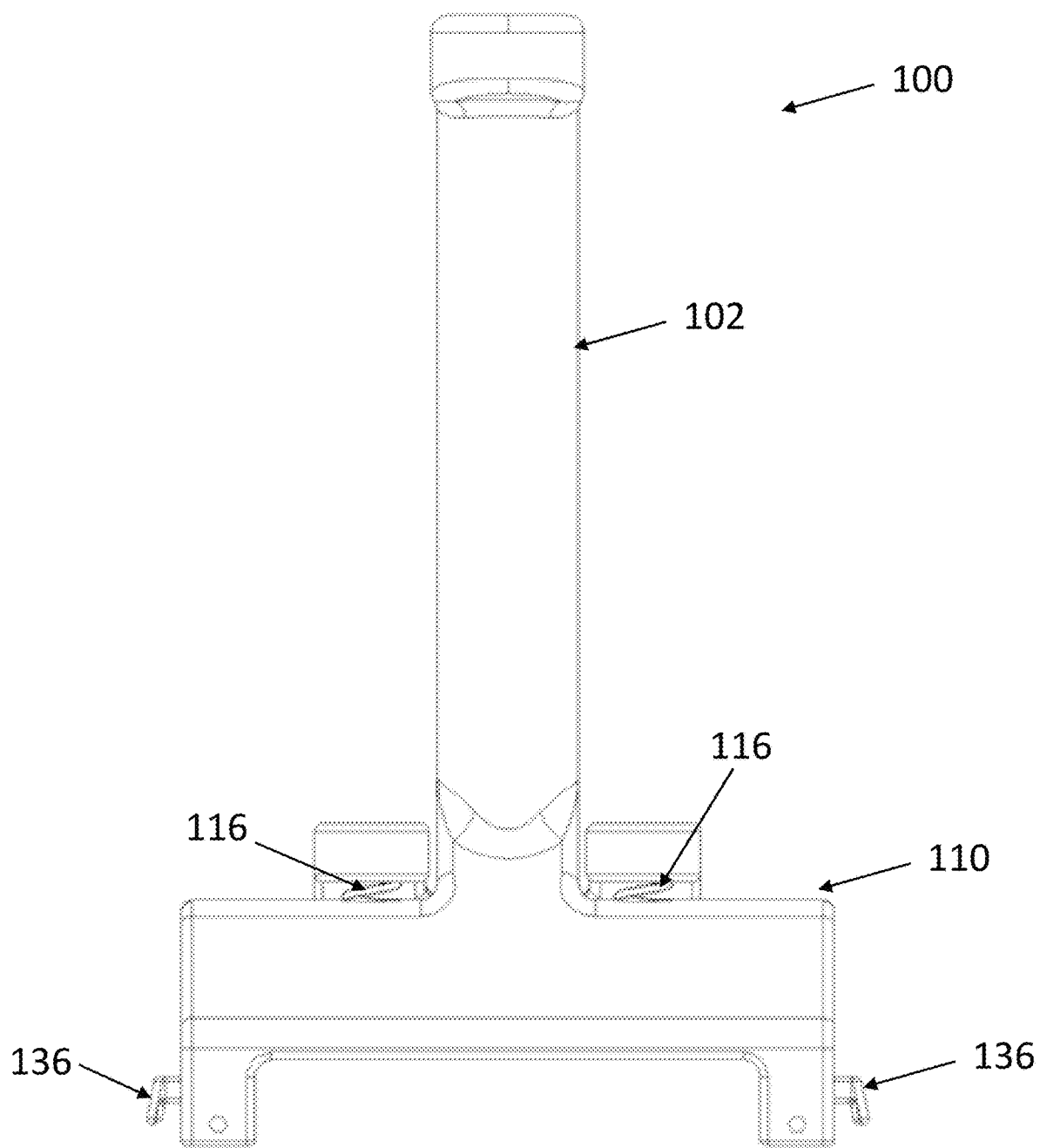
FIG. 9 is a front plan view of the plate handling device of the present disclosure.

Referring now specifically to FIG. 9, a front view of the plate handling device 100 of the present disclosure is shown. The plate handling device 100 includes the handle 102 and the base 110. In various embodiments, the base 110 further includes a plurality of guides 136. The guides 136 are adapted to guide the plate handling device 100 onto the plate 114 for easy engagement. Also seen in FIG. 9 are the biasing members 116. Again, in the present embodiment, the biasing members 116 are springs disposed inside of the cavities 120. The springs are compressed inside of the cavities 120, resulting in a force causing the base 110 to contract and grip the plate 114 (shown in FIG. 2). It will be appreciated that the biasing members 116 of the present embodiment may include any other force providing device such as the springs of the present disclosure.

In various embodiments, the force that the biasing members 116 provide may be preselected for different purposes. For example, a screw mechanism may be utilized to compress or decompress the biasing members 116 to preselect a desired clamping force onto the plate 114.

Figure 10:
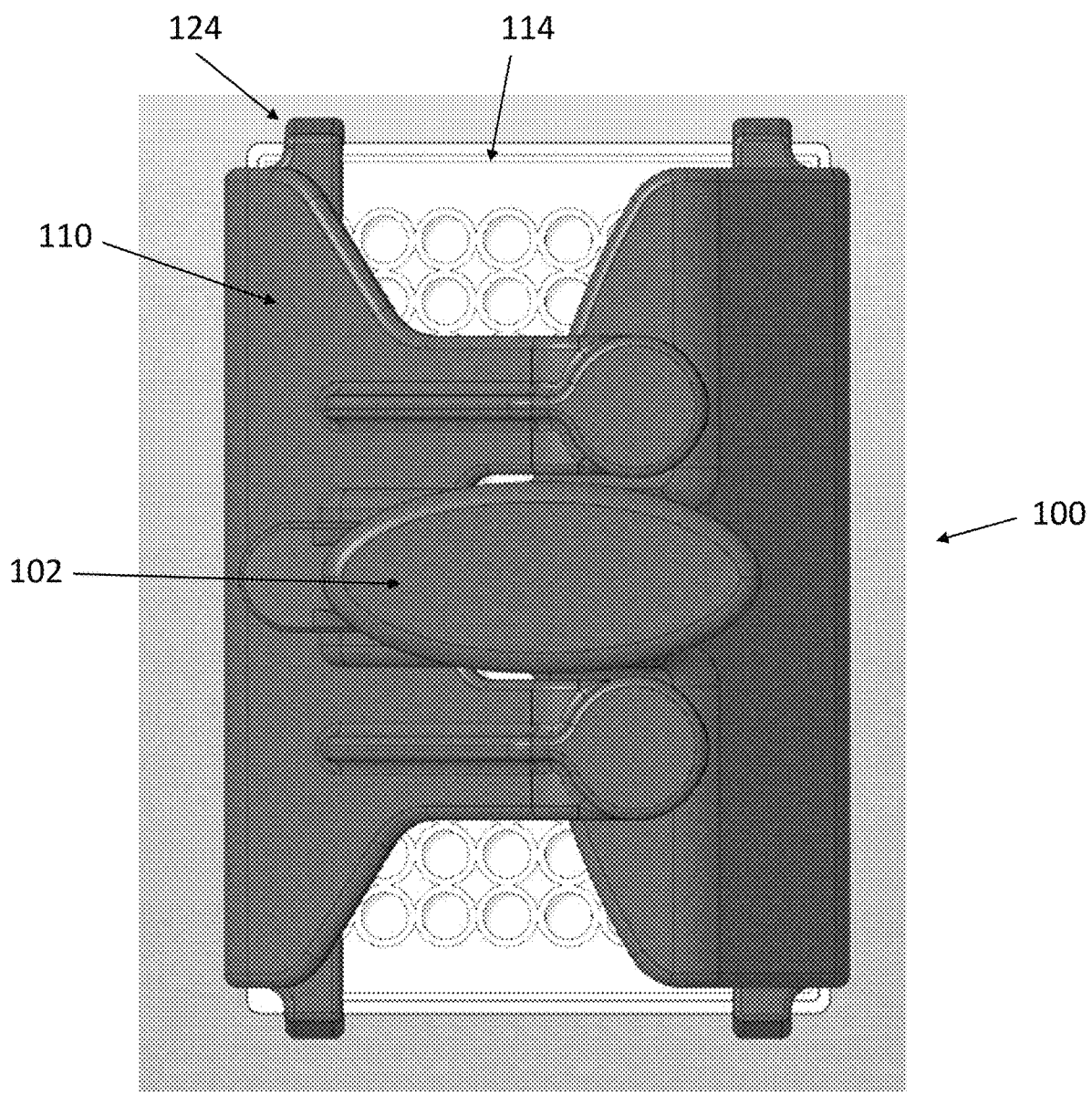
FIG. 10 is a top plan view of the plate handling device of the present disclosure.

Referring now specifically to FIG. 10, a top view of the plate handling device 100 of the present disclosure is shown. The plate handling device 100 again includes a plurality of plate interfacing members 124 adapted to both guide the plate 114 into place and to secure the plate 114 in the base 110 of the plate handling device 100. In various embodiments, the plate interfacing members 124 guide and secure the corners of the plate 114 via the extensions 128. It will be appreciated that in other embodiments, the plate interfacing members 124 may be positioned and shaped to adapt to any plate 114 or other vessel desired to be handled.

Figure 11:
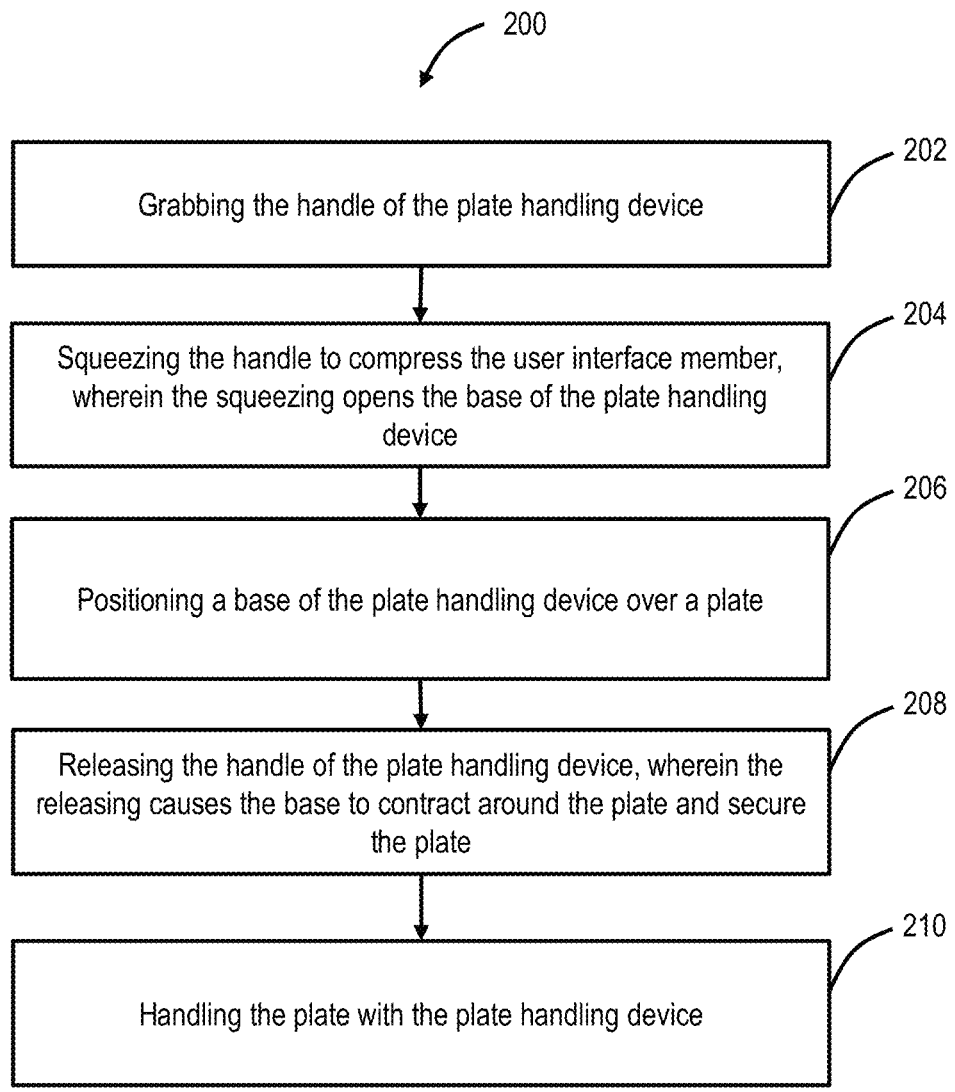
FIG. 11 is a flow diagram showing a method of using the plate handling device of the present disclosure.

Referring now specifically to FIG. 11, a flow diagram shows a method 200 of using the plate handling device of the present disclosure. to use the plate handling device of the present disclosure, a user will grab 202 the handle of the plate handling device. The user will squeeze 204 the handle, compressing the user interface member into the outer handle member, thus expanding the base of the plate handling device. As the user interface member is squeezed into the outer handle member, this causes the biasing members to become increasingly compressed, and causes the second base member to rotate about the pin. The rotation causes the base to expand, creating room for a plate to be positioned between of the plate interfacing members. The user then positions 206 the base of the plate handling device over a plate. To secure the plate to the plate handling device, the user then releases 208 the handle allowing the user interface member to expand. This allows the biasing members to force the second base member to rotate about the pin, causing the base to contract around the plate, thus securing it to the plate handling device. The user is then able to handle 210 the plate with the plate handling device.

It will be appreciated that other embodiments may include different methods of using the plate handling device of the present disclosure. For example, such embodiments may include pin and biasing member positioning which allows the base to be contracted when a user squeezes the handle, and base expansion when the handle is released. The method of using the plate handling device of the present disclosure shall be construed as a non-limiting example.

the plate handling device 100 of the present disclosure may be used to remove a plate, such as a 96 well microplate, from a PCR cycler. The height of skirts on most 96-well plates, which are made from polypropylene, is short. This short skirt height makes grabbing and removing these plates 114 from PCR machines using currently known methods tricky because the plates 114 are firmly embedded (and in some cases may be stuck) in the PCR block. In various embodiments the plate handling device 100 can help contribute to easier removal of such plates 114 from PCR machines.

There are applications where samples have to be boiled. For example, boiling tube racks allow floating of test tubes in boiling water baths. Currently known test tube floating racks have a vertical member for grabbing by a user's fingers to allow removing the test-tube filled rack from the boiling water bath. Plates 114 have no currently known means for removing them other than picking them up from a hot water bath directly with a user's fingers. In various embodiments, the plate handling device 100 can help contribute to easier removal of such plates from a water bath.

Given by way of non-limiting example, an illustrative sonicator uses rectangular 96-well plates. The sonicator circulates glycerol to transmit ultrasound and to cool the plates 114. After a run, coupling fluid is drained through suction. This clinches the plate 114 to the manifold, thereby adding complexity to removing the plate 114 from the manifold with gloved fingers. This added complexity results from the plate 114 being seated tightly in the manifold and from the plate 114 being covered with a lubricious coupling fluid. In various embodiments the plate handling device 100 can help contribute to easier removal of such plates from a sonicator while also helping contribute to reducing likelihood of finger contamination with glycerol.

Plates 114 and flasks of various sizes and geometries can be placeable in and retrievable from an incubator using the plate handling device 100. Plates 114 and flasks with different geometries and sizes are used for tissue culture. These plates 114 and flasks typically are managed directly with gloved hands. As a result, gloves can become contaminated which can increase the risk of contaminating hands when removing gloves. In various embodiments, a plate handling device 100 that matches the shape and size of plastic ware used in tissue cultures can help contribute to making handling individual plates 114 and flasks and stocks of plates and flasks simpler while reducing biohazards. In some such embodiments, the plate handling device 100 may be equipped with motorized telescopic arms (that may be battery operated) for facilitating access to plates and flasks in an incubator (especially those that are placed deep inside the incubator).

From the foregoing, it will be appreciated that specific embodiments of the present subject matter have been described herein for purposes of illustration, but that various modifications may be made without deviating from the spirit and scope of the present subject matter. Accordingly, the present subject matter is not limited except as by the appended claims.

What is claimed is:

1. A plate handling device for handling of analytical and culture vessels, the plate handling device comprising:
 a base having a first base member and a second base member configured to hold a plate, wherein the base is adapted to expand and contract to secure the plate to the plate handling device; and
 a handle having an upper end and a lower end, wherein the handle is adapted such that squeezing the handle expands the base and releasing the handle contracts the base around the plate to secure and hold the plate.

2. The plate handling device of claim 1, wherein the handle further comprises:
 an outer handle member fixedly attached to the first base member; and
 a user interface member fixedly attached to the second base member, wherein the user interface member is pivotably attached to the lower end of the handle and pivotably receivable in portions of the outer handle member.

3. The plate handling device of claim 2, wherein the plate handling device includes a plurality of biasing members adapted to produce a force on the plate when the plate is held by the base, wherein the force is sufficient to secure the plate to the base without slippage.

4. The plate handling device of claim 3, wherein the plurality of biasing members are adapted to produce the force on the plate when an operator or a robotic manipulator applies a force to the handle and release the force from the plate when the operator releases the force from the handle.

5. The plate handling device of claim 2, wherein the base further comprises a plurality of plate interfacing members fixedly attached to the first and second base members and adapted to align and grasp the plate.

6. The plate handling device of claim 5, wherein the plate interfacing members are tapered for alignment and self-centering of the plate handling device with respect to the plate.

7. The plate handling device of claim 5, wherein the plate interfacing members further comprise a plurality of grip inserts adapted to grip the plate.

8. The plate handling device of claim 5, wherein the plurality of plate interfacing members are positioned to simultaneously interface with corresponding corners of the plate.

9. The plate handling device of claim 2, wherein the user interface member is pivotably attached to the lower end of the handle with a pin.

10. The plate handling device of claim 2, wherein the base is adapted to be stable on a flat surface without a plate installed.

11. The plate handling device of claim 2, wherein the upper end of the handle is adapted to rest on top of a user's hand.

12. The plate handling device of claim 1, wherein the plate comprises a stack of multiple plates.

13. The plate handling device of claim 1, wherein the handle further comprises:
 an outer handle member integrally formed with the first base member; and
 a user interface member integrally formed with the second base member.

14. The plate handling device of claim 1, wherein the handle further comprises:
 an outer handle member fixedly attached to the first base member and defining an opening to an interior extending from an upper end to a lower end of the outer handle member; and
 a user interface member fixedly attached to the second base member and received within the opening of the outer handle such that the user interface partially fills the interior of the outer handle member from the upper end to the lower end,
 wherein the plate handling device is configured such that squeezing the handle causes the user interface member to completely fill the interior of the outer handle member and thereby fully expand the base.

15. The plate handling device of claim 1, wherein the first base member and second base member are biased toward a fully contracted position such that squeezing the handle causes expansion of the first base member relative to the second base member.

16. A method of handling a plate with a plate handling device having a base including a first base member and a second base member configured to hold a plate, the base adapted to expand and contract to secure the plate to the plate handling device, and a handle having an upper end and a lower end, the method comprising the steps of:
 squeezing the handle such that the base of the plate handling device expands;
 positioning the base of the plate handling device over a plate;
 releasing the handle of the plate handling device, wherein the releasing causes the base to contract around the plate and secure the plate; and
 handling the plate with the plate handling device.

17. The method of claim 16, wherein
 squeezing the handle comprises compressing a user interface member fixedly attached to the second base member within an outer handle member fixedly attached to the first base member, wherein the user interface member is pivotably attached to the lower end of the handle and pivotably receivable in portions of the outer handle member.

18. The method of claim 17, wherein releasing the handle of the plate handling device causes a plurality of biasing members to produce a force contracting the base around the plate when the plate is held by the base.

19. The method of claim 17, wherein releasing the handle of the plate handling device causes a plurality of plate interfacing members fixedly attached to the first and second base members to align and grasp the plate such that the base secures the plate.

20. The method of claim 17, wherein the user interface member is pivotably attached to the lower end of the handle with a pin.

21. The method of claim 16, wherein the upper end of the handle is adapted to rest on top of a user's hand.

22. The method of claim 16, wherein the plate comprises a stack of multiple plates.

\* \* \* \* \*